April 29, 1947.  L. A. WERTH  2,419,666
DEVICE FOR SEPARATING LIQUIDS OF DIFFERENT SPECIFIC GRAVITY
Filed July 24, 1944
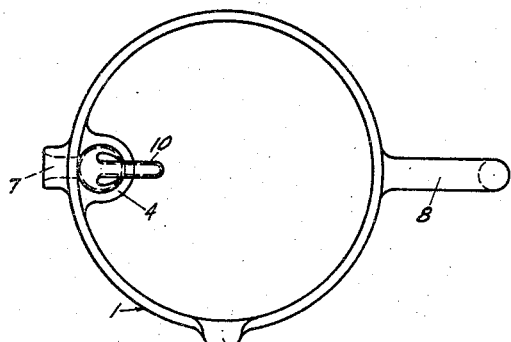
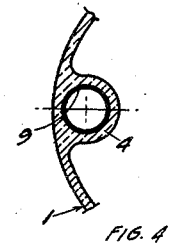
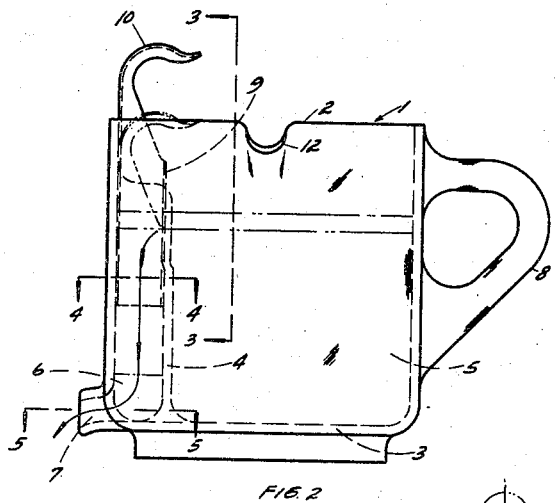
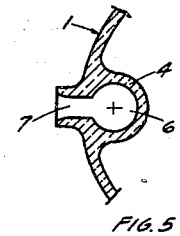
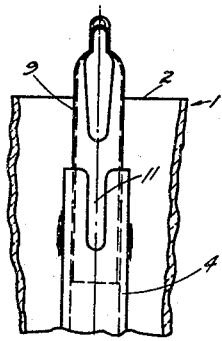
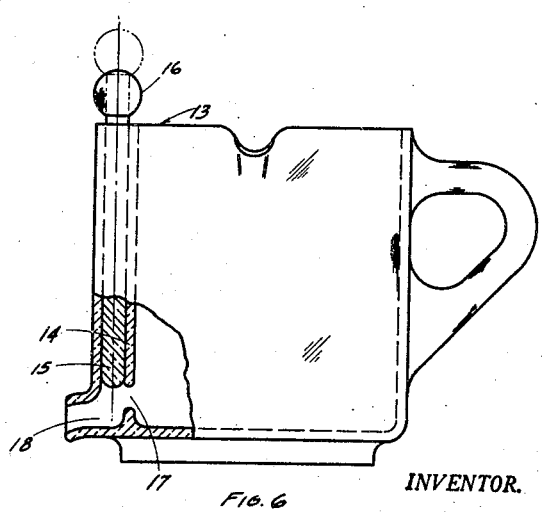
INVENTOR.
BY Laurence A. Werth
ATTORNEYS Patented Apr. 29, 1947

2,419,666

UNITED STATES PATENT OFFICE 2,419,666

DEVICE FOR SEPARATING LIQUIDS OF DIFFERENT SPECIFIC GRAVITY

Laurence A. Werth, Dearborn, Mich.

Application July 24, 1944, Serial No. 546,397

2 Claims. (Cl. 210—51)

1

The invention relates to devices for separating liquids of different specific gravity and has for one of its objects to provide a simple construction of liquid separating device which may be readily manipulated.

The invention has for another object to so construct the device that the operator may readily determine by sight the functioning of the device.

With these and other objects in view, the invention resides in the novel features of construction and combinations and arrangements of parts as more fully hereinafter set forth.

In the drawings:

Figure 1 is a plan view of a liquid separating device embodying the invention;

Figure 2 is a side elevation thereof;

Figures 3, 4 and 5 are cross sections on the lines 3—3, 4—4 and 5—5, respectively, of Figure 2;

Figure 6 is a side elevation, partly broken away and in section, of another liquid separating device embodying the invention.

As illustrated in Figures 1 to 5, inclusive, the device for separating liquids of different specific gravity, such as liquid grease from liquid gravy, cream from milk, etc., comprises the cup-shaped receptacle 1 having the open upper end 2, the bottom wall 3 and the partition 4 extending upwardly from the bottom wall and terminating below the upper end and dividing the receptacle into the main chamber 5 and the second chamber 6, the partition forming a side wall of the second chamber. The receptacle also has the outlet 7 at its lower end communicating with the lower end portion of the second chamber 6. To facilitate handling, the receptacle is provided with the handle 8 which is diametrically opposite the outlet 7.

9 is a tubular valve which is preferably formed of metal, such as aluminum. The valve is cylindrical and extends vertically into and has a sliding fit with the second chamber 6 so that liquid cannot flow into the second chamber between the partition or the side wall of the receptacle and the valve. The valve is provided at its upper end with the transverse handle 10 which may be readily engaged to lower the valve a distance sufficient to enable all of the liquid grease, etc., in the space above the partition to enter the longitudinally extending passageway in the valve and flow therethrough into the second chamber and then to the outlet. To enable the operator to readily see the operation, the receptacle is made transparent and may be

2 formed of suitable material, such as plastic or glass.

To effectively guide the valve, it will be noted that the partition 4 extends upwardly within the receptacle a substantial distance. At the same time the upper portion of the partition is formed with the elongated opening 11 to enable removal of the lighter liquid when its lower level is below the upper end of the partition.

The receptacle is provided with the pouring spout 12 at its upper end and extending transversely of the plane of the outlet 7 and the handle 8 so that when the pouring spout is used the liquid remaining in the receptacle will not flow through the longitudinal passageway in the valve.

In the modification illustrated in Figure 6, the receptacle 13 is formed with the partition 14 which extends upwardly to the upper end of the receptacle and cooperates with the side wall of the receptacle to form a cylindrical chamber for receiving the valve 15 having the handle 16 at its upper end. In this case, the partition is formed at its lower end with the opening 17 in substantial registration with the outlet 18. It will be noted that the pouring spout extends transversely of the plane of the outlet and the diametrically opposite handle.

What I claim as my invention is:

1. A device for separating liquids of different specific gravity comprising a receptacle having an open upper end and a partition extending upwardly from the bottom wall of said receptacle and terminating below the upper end of said receptacle, said partition dividing said receptacle into a pair of chambers, said receptacle also having an outlet leading from the lower end portion of one of said chambers, and a tubular valve extending within and fitting said last mentioned chamber and having a longitudinally extending passageway communicating at its lower end with said last mentioned chamber and at its upper end with the space above said partition, said valve having an integral handle at its upper end and being vertically adjustable to conduct the lighter liquid from the space above said partition to said last mentioned chamber.

2. A device for separating liquids comprising a receptacle having an open upper end and a partition extending upwardly from the bottom wall of said receptacle and terminating below the upper end of said receptacle, said partition dividing said receptacle into a pair of chambers and having a vertically extending elongated opening in its upper end portion, said receptacle also having an outlet leading from the lower end portion of one of said chambers, and a tubular valve extending within said last mentioned chamber and having a longitudinally extending passageway with openings at its upper and lower ends, said valve being adjustable to register the opening at the upper end with the elongated opening of said partition at different heights of the elongated opening.

LAURENCE A. WERTH.

REFERENCES CITED

The following references are of record in the file of this patent:

UNITED STATES PATENTS

| Number | Name | Date |
|---|---|---|
| 27,371 | Magee | Mar. 6, 1860 |
| 350,810 | Cole | Oct. 12, 1886 |
| 203,190 | Parkin | Apr. 30, 1878 |
| 1,380,066 | Johnson | May 31, 1921 |
| 237,999 | Platt et al. | Feb. 22, 1881 |
| 399,741 | Clarke | Mar. 19, 1889 |
| 976,979 | Berchtold | Nov. 29, 1910 |
| 1,121,993 | Eichler | Dec. 22, 1914 |
| 1,262,076 | Marston | Apr. 9, 1918 |
| 2,287,156 | White | June 23, 1942 |
| 888,627 | Luyties | May 26, 1908 |
| 911,314 | Maranville | Feb. 2, 1909 |
| 1,513,882 | Bateman | Nov. 4, 1924 |
| 1,778,326 | Kutzer | Oct. 14, 1930 |
| 1,396,889 | Sepulchre | Nov. 15, 1921 |
| 306,169 | Moseley | Oct. 7, 1884 |
| 1,429,363 | Meredith | Sept. 19, 1922 |

FOREIGN PATENTS

| Number | Country | Date |
|---|---|---|
| 9,770 | Br. | 1913 |